UNITED STATES PATENT OFFICE.

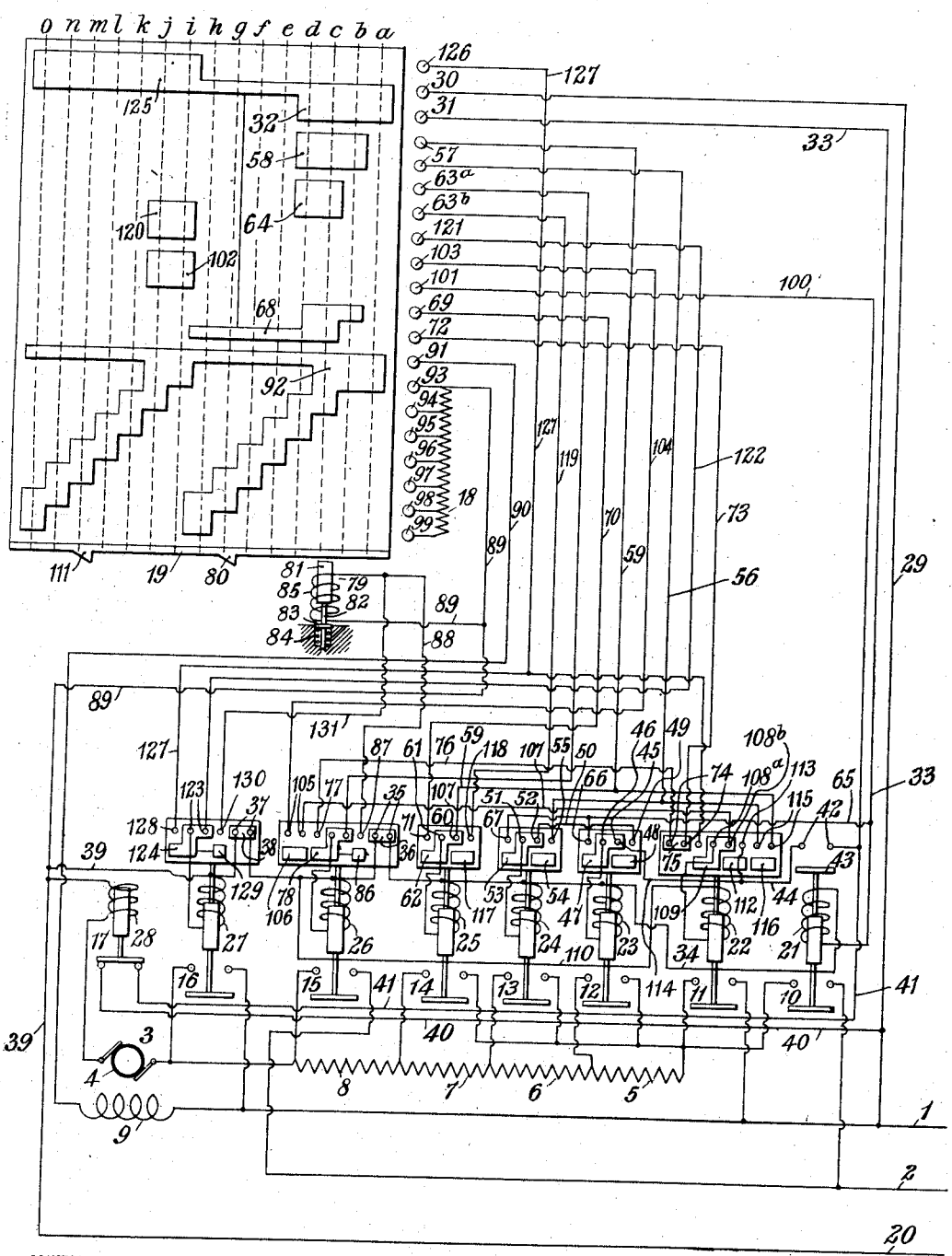

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

MULTIVOLTAGE SYSTEM OF ELECTRIC-MOTOR CONTROL.

No. 875,582.  Specification of Letters Patent.  Patented Dec. 31, 1907.

Application filed May 6, 1907. Serial No. 372,137.

*To all whom it may concern:*

Be it known that I, HENRY D. JAMES, a citizen of the United States, and a resident of Pittsburg, in the county of Allegheny and State of Pennsylvania, have invented a new and useful Improvement in Multivoltage Systems of Electric-Motor Control, of which the following is a specification.

My invention relates to systems of electric motor control, and has special reference to systems for the control of direct current motors which are supplied with energy from multi-voltage sources.

The object of my invention is to provide improved means for controlling the acceleration and speed regulation of electric motors which are adapted to drive delicate and intricate machinery at widely varying speeds.

In the operation of printing presses and similar machinery, it is desirable to so regulate the driving motor as to effect a gradual acceleration to a relatively slow speed which may be maintained for a considerable period of time. Such provision should also be made that, when the attendant is satisfied that the machine is operating satisfactorily, the driving motor may be again accelerated to a relatively high speed from which a suitable speed variation in either direction is permitted.

According to my present invention, I provide a shunt or compound wound electric motor, a plurality of independently operated control switches therefor, and a master controller for said switches whereby the motor is connected to a low-voltage source of electrical energy with a suitable resistance in its armature circuit, a portion of the resistance is automatically short-circuited to effect a predetermined acceleration, after which the speed regulation of the motor, together with the circuit connections, may be varied within predetermined limits at the will of the attendant. When the master controller is then moved to an advanced position, the motor speed will be materially increased, circuit connections being established from a source of higher voltage through the starting resistance which is then gradually and automatically short-circuited by the successive closure of the control switches. Finally, when the highest speed is reached, a suitable variation may be effected, at the will of the attendant, by means of the master controller.

It will be observed that operating speeds are provided at the lower voltage when a predetermined armature resistance is included in the circuit but that all the resistance is cut out automatically as soon as the motor is connected to the higher voltage source. By this means, a less expensive resistance may be employed since the slow speed operation will obviously continue only for a limited period and it is impossible for the resistance to remain in the armature circuit when the machine operates continuously at the higher speeds.

The single figure of the accompanying drawing is a diagrammatic view of a control system arranged in accordance with my invention.

Electric energy is supplied from a relatively low-voltage source through a conductor 2 to a motor 3 having an armature 4, an accelerating resistance comprising sections 5, 6, 7 and 8, and a field magnet winding 9, the armature resistance and the circuit connections being controlled by a series of independently operated switches 10, 11, 12, 13, 14, 15, 16 and 17. The field magnet winding 9 is provided with a regulating resistance 18, and a master switch 19 governs the independently operated switches and the resistance 18. Circuit connections are completed through a common negative line conductor 20. The switches 10, 11, 12, 13, 14, 15, 16 and 17 are actuated by electromagnets having windings 21, 22, 23, 24, 25, 26, 27 and 28. The switch 28 is normally closed, its winding being energized to open the switch when a predetermined current traverses the motor circuit and the other control switches are closed only when their electro-magnets are energized. The master switch 19 is adapted to occupy a plurality of "off" positions $a$ to $o$, inclusive.

Assuming that the master switch 19 is moved from its "off" position to position $a$, circuit is first established from the line conductor 1 through conductor 29, contact fingers 30 and 31 (which are bridged by contact member 32 when the master controller occupies positions $a$, $b$, $c$ and $d$), conductor 33, winding 21, conductor 34, contact fingers 35 (which are bridged by contact member 36 when the switch 15 is opened), contact fingers 37 (which are bridged by contact member 38 when the switch 16 is opened), and conductor 39 to the negative line conductor 20. Closure of the switch 10 is thus effected and a motor circuit is established from the lower-voltage line conductor 2 through this switch, resistance sections 5, 6, 7 and 8, armature 4, magnet winding 28 of switch 17 and conductor 39 to the negative line conductor. A control circuit is also now established from the line conductor 1 through conductor 40, switch 17, conductor 41, contact fingers 42 (which are bridged by contact member 43 when the switch 10 is closed), conductor 44, contact fingers 45 and 46 (which are bridged by contact member 47 when the switch 12 is opened), and winding 23 to conductor 34, from which point the circuit is completed as above indicated. It will be observed that the energizing of the winding 23 which effects closure of the switch 12 is dependent, according to a well known arrangement, upon the limit switch 17 but is independent of the master switch 19. When the switch 12 is closed, a circuit is continued from conductor 44 through contact fingers 45, contact members 48, contact finger 49, conductor 50, contact fingers 51 and 52 (which are bridged by contact member 53 when the switch 13 is opened), and magnet winding 24 to the switch 34, the circuit being completed as above indicated. It will be observed that closure of the switch 13 is also dependent upon the limit switch 17 and is independent of the master controller. The resistance sections 5 and 6 are respectively short-circuited when the switches 12 and 13 are closed. The automatic acceleration of the motor will rest at this point as long as the master switch occupies position $a$. If the master switch is moved to the position $b$, the circuit is established from conductor 50 through contact finger 52, contact member 54, contact finger 55, conductor 56, contact fingers 57 (which are now bridged by contact member 58), conductor 59, contact fingers 60 and 61 (which are bridged by the contact member 62 when the switch 14 is opened), and winding 25 to conductor 34, the circuit being completed as before indicated. In a similar manner, closure of the switch 15 is dependent upon engagement of contact fingers 63$^a$ and 63$^b$ with contact member 64 and is therefore partially under the control of the attendant.

If the motor is at rest and the master switch is moved to the position $c$, the switches 10, 12, 14 and 15 will be closed automatically and successively, if permitted by the limit switch 17 the operating magnets of the switches being energized from a circuit which is independent of the limit switch as soon as the switch is closed. The holding circuits for the switches 12 and 13 are established from the conductor 33 through conductor 65, contact fingers 66 and 67 which move respectively into engagement with contact members 47 and 53 when the switches have closed. The holding circuits for the magnet windings 25 and 26 of the switches 14 and 15 are dependent upon the master switch 19 so that the attendant may move the master switch from the position $c$ to the positions $b$ or $a$, thereby decreasing the speed of the motor by re-inserting resistance sections 8 and 7, at will. These circuits may be traced from conductor 29 through contact finger 30, contact members 32 and 68, contact finger 69, conductor 70 and contact finger 71 (which engages the contact member 62 when the switch 14 is closed), and from contact member 68 through contact finger 72, conductor 73, contact fingers 74 (which are bridged by contact member 75 when the switch 11 is open, and conductor 76 to contact finger 77, (which engages a contact member 78 of the switch 15 corresponding to the member 62). The contact member 68 is of such shape that the finger 69 moves into engagement with it when the master switch occupies position $b$ and the contact finger 72 engages the contact member when the master switch occupies position $c$.

In order to avoid injury to the motor, an electro-magnetically-released stop 79 engages a projection 80 rom the master switch 19 at the position $g$ and comprises an armature 81, a rod 82 having a collar 83, a spring 84 and an electro-magnet winding 85 which acts in opposition to the spring to release the armature from engagement with the projections on the master switch. If the attendant moves the master switch immediately from the "off" position to the position $c$, the switches 10, 12, 13, 14 and 15 will be closed automatically and successively, if permitted by the limit switch 17, as hereinbefore explained, and it will be impossible for the attendant to move the master switch from the position $c$ to the positions $d, e, f, g, h$ and $i$ until the switch 15 is closed. When the switch 15 is closed, the contact fingers 35 are disengaged from the contact member 36 thereby deënergizing the magnet windings 23, 24 and 25 and permitting the switches 12, 13 and 14 to open, and the magnet winding 85 of the stop 79 is energized, a circuit being established from the conductor 76 through contact finger 77, contact members 78 and 86, contact finger 87 (which engages the contact member 86 when the switch 15 is closed), conductor 88, magnet winding 85, and conductors 89 and 39 to the negative line conductor 20. It will be observed that the circuit above traced is in multiple with the holding circuit for the magnet winding 26 of the switch 15. As long as the master controller 19 occupies position $c$, after the switch 15 is closed, the stop 79 will be released, so that the attendant may increase the speed of the motor by introducing resistance in the field circuit. This is accomplished when the controller is moved from the position c to the positions d, e, f, g and h. In the positions a, b and c, the circuit is established from the line conductor 1 through the field magnet winding 9, conductor 90, contact finger 91, contact member 92, contact finger 93, and conductors 89 and 39 to the negative line conductor 20. In the positions d, e, f, g and h, the contact finger 93 is disengaged from the contact member 92 and contact fingers 94, 95, 96, 97, 98 and 99 are successively moved into engagement with the contact member. In this way, the field resistance 18 is gradually introduced and the speed of the motor is increased.

When the master controller is moved from position h to position i, a circuit is established from the positive line conductor 1, through conductor 40, limit switch 17, conductors 41 and 100, contact finger 101, contact member 102, contact finger 103, conductor 104, contact fingers 105 (which are bridged by contact member 106 when the switch 15 is closed), conductor 107, contact fingers 108$^a$ and 108$^b$ (which are bridged by contact member 109 when the switch 11 is opened), magnet coil 22, conductor 110, contact fingers 37, contact member 38 and conductor 39 to the negative line conductor 20. When the switch 11 is closed, resistance sections 5, 6, 7 and 8 are connected between the low and high-voltage supply lines 2 and 1 after which the switch 15 is immediately opened by reason of the disengagement of the contact finger 74 from the contact finger 75. The opening of the switch 15 interrupts the circuit established through the magnet winding 85, thereby releasing the stop 79, which now engages a projection 111 and temporarily prevents the master switch from further movement in the same direction. By the opening of the switch 15 a motor circuit is established from the higher-voltage line conductor 1 through the switch 11, resistance sections 5, 6, 7 and 8, armature 4, magnet winding 28 and conductor 39 to the negative line conductor 20. When the motor is connected to this circuit, the resistance sections are gradually and automatically short-circuited independently of the master switch 19, circuit being continued, when the switch 11 is closed, from the conductor 107 through the contact finger 108$^b$, contact member 112, contact finger 113, conductor 114, contact fingers 45 and 46, contact member 47, magnet winding 23, conductor 34, contact fingers 35, contact member 36, contact fingers 37, contact member 38 and conductor 39 to the negative line conductor 20. In this way, the closure of the switch 12 is again effected and the switches 13 and 14 are successively closed, circuit connections being established as above indicated except that closure of the switch 14 is independent of the contact fingers 57, since the circuit formerly established therethrough is now completed by the engagement of contact fingers 115 with the contact member 116 when the switch 11 is closed.

When the switch 14 is closed the circuit is continued from contact finger 60 through contact member 117, contact finger 118, conductor 119, contact finger 63$^b$, contact member 120, contact finger 121, conductor 122, contact fingers 123, contact member 124, magnet winding 27 and conductor 39 to the negative line conductor 20. It will be observed that the switch 16 is now closed and the motor is connected across the higher-voltage circuit without resistance. The closure of the switch 16 moves the contact member 38 out of engagement with the fingers 37 and thereby interrupts the return circuits for electro-magnets 22, 23, 24 and 25. The switch 16 remains closed when the master controller occupies positions i, j, k, l, m, n and o, a holding circuit being established from line conductor 1, through conductor 29, contact finger 30, contact member 125, contact finger 126, conductor 127, contact finger 128, contact member 124, contact finger 123, magnet winding 27 and conductor 39 to the negative line conductor and a branch circuit is established from contact member 124 to a contact member 129, contact finger 130, conductor 131, magnet winding 85 of the stop 79 and conductors 89 and 39 to the negative line conductor 20. It is evident that when the motor is connected with the higher-voltage circuit it is impossible to introduce resistance in the field circuit until the armature resistance has been short-circuited, as well as when the motor is connected to the low-voltage. When the controller occupies positions j, k, l, m, n and o, the resistance 18 is gradually inserted in the field circuit.

As the master controller returns from the position o to the position j, resistance 18 is removed from the field circuit and the speed of the motor is decreased and, as the controller moves from position i to position h, the holding circuit for the switch 16 is interrupted and this switch is permitted to open. In this way, the motor circuit is interrupted and, when the controller reaches position d, the switch 10 is closed, thereby connecting the motor to the circuit of lower voltage with the resistance sections 5, 6, 7 and 8 connected in series with its armature. It is of special advantage to connect the resistance in series with the armature circuit in passing from the higher-voltage to the lower-voltage circuits since the counter electromotive force of the armature may be considerably in excess of the voltage supplied by the lower-voltage line.

The projections 80 and 111 are so arranged as to permit the free passage of the master switch from the position o to the position a, and the circuit arrangements of the system are such that it is impossible to injure the motor by moving the master switch too rapidly in either direction.

Variations in the circuit arrangements may, of course, be effected within the scope of my invention, and I desire that only such modifications be imposed as are indicated in the appended claims.

I claim as my invention:

1. In a control system, the combination with switches adapted to alternately close and open, the closures being in predetermined sequences, of manually operated means for selectively governing the operation of the switches only when they are closing in certain of the sequences.

2. In a control system, the combination with switches adapted to close in sequences and to open and finally reclose in sequence, of manually-operated means for selectively governing the operation of the switches only when they are closing in one of the sequences.

3. In a control system, the combination with a plurality of switches adapted to close in a predetermined sequence and to open and finally reclose in the same sequence, of a master controller for selectively governing the operation of the switches only when they are closing in the final sequence.

4. In a control system, the combination with supply circuits of unlike voltage, an electric motor having armature and field magnet windings and resistances therefor, and a plurality of independently operated resistance control switches adapted to close in sequence and to open and reclose in the same sequence for successively connecting the motor to the supply circuits, of manually operated means for selectively governing the operation of the switches only when they are closing in the final sequence.

5. In a control system, the combination with a multi-voltage source of electrical energy, an electric motor having an armature winding, a resistance therefor and a series of independently-operated control switches for connecting the motor and the resistance to the lower-voltage source, for gradually short-circuiting the resistance, for connecting the resistance between the lower and the higher-voltage supply circuit, for interrupting the low-voltage circuit and for gradually short-circuiting the resistance, of a master switch for selectively controlling the resistance-control switches only on the lower voltage.

6. In a control system, the combination with a multi-voltage source of electrical energy, an electric motor having an armature winding, a resistance therefor and a series of independently-operated control switches for connecting the motor and the resistance to the lower-voltage source, for gradually short-circuiting the resistance, for connecting the resistance between the lower and the higher-voltage supply circuits, for interrupting the low-voltage circuit and for gradually short-circuiting the resistance, of means for automatically retarding the action of the control switches, and a master switch for selectively governing the resistance-control switches only on the lower voltage.

7. In a control system, the combination with a multi-voltage source of electrical energy, an electric motor having an armature winding, a resistance therefor and a series of independently-operated control switches for connecting the motor and the resistance to the lower-voltage source, for gradually short-circuiting the resistance, for connecting the resistance between the lower and the higher-voltage supply circuits, for interrupting the low-voltage circuit and for gradually short-circuiting the resistance, of means dependent upon a predetermined motor current for automatically retarding the action of the control switches, and a master switch for selectively controlling the resistance-control switches only on the lower voltage.

8. In a control system, the combination with a multi-voltage source of electrical energy, an electric motor having armature and field magnet windings, resistances therefor, and a series of independently-operated control switches for connecting the motor and the armature resistance to the lower-voltage source, for gradually short-circuiting the said resistance, for connecting the armature resistance between the lower and the higher-voltage supply circuits, for interrupting the low-voltage circuit and for gradually short-circuiting the resistance, of a master switch for governing the field resistance and for selectively controlling the armature resistance-control switches only on the lower-voltage circuit.

9. In a control system, the combination with a multi-voltage source of electrical energy, an electric motor having armature and field magnet windings, resistances therefor, and a series of independently-operated control switches for connecting the motor and the armature resistance to the lower-voltage source, for gradually short-circuiting the resistance, for connecting the armature resistance between the lower and the higher-voltage supply circuits, for interrupting the low-voltage circuit and for gradually short-circuiting the resistance, of means for automatically retarding the action of the armature resistance-control switches, and a master switch for selectively controlling said switches only on the lower voltage.

10. In a control system, the combination with a multi-voltage source of electrical energy, an electric motor having armature and field magnet windings, resistances therefor, and a series of independently-operated control switches for connecting the motor and the armature resistance to the lower voltage source, for gradually short-circuiting the resistance, for connecting the armature resistance between the lower and the higher-voltage supply circuits for interrupting the low-voltage circuit and for gradually short-circuiting the resistance, of means dependent upon a predetermined motor current for automatically retarding the armature resistance-control switches, and a master switch for selectively controlling said switches only on the lower voltage.

In testimony whereof, I have hereunto subscribed my name this 29th day of April, 1907.

HENRY D. JAMES.

Witnesses:
   Ross W. Copeland,
   Birney Hines.